(12) United States Patent
Thompson et al.

(10) Patent No.: US 11,420,762 B2
(45) Date of Patent: Aug. 23, 2022

(54) ROTOR ASSEMBLY

(71) Applicant: Bell Textron Inc., Fort Worth, TX (US)

(72) Inventors: George Matthew Thompson, Lewisville, TX (US); Paul Sherrill, Grapevine, TX (US); Jonathan Knoll, Burleson, TX (US)

(73) Assignee: Textron Innovations Inc., Providence, RI (US)

( * ) Notice: Subject to any disclaimer, the term of this patent is extended or adjusted under 35 U.S.C. 154(b) by 391 days.

(21) Appl. No.: 16/679,000

(22) Filed: Nov. 8, 2019

(65) Prior Publication Data

US 2021/0139157 A1 May 13, 2021

(51) Int. Cl.
| | |
|---|---|
| *A47C 7/74* | (2006.01) |
| *B64D 35/04* | (2006.01) |
| *B64C 11/00* | (2006.01) |
| *B64C 11/46* | (2006.01) |
| *B64D 27/24* | (2006.01) |

(Continued)

(52) U.S. Cl.
CPC ............ *B64D 35/04* (2013.01); *B64C 11/001* (2013.01); *B64C 11/46* (2013.01); *B64D 27/24* (2013.01); *B64C 29/0033* (2013.01); *F16H 2057/02034* (2013.01); *F16H 2057/02043* (2013.01)

(58) Field of Classification Search
CPC ..... B64C 27/48; B64C 27/32; B64C 29/0033; B64C 11/06; F01D 7/00; F16D 2003/2026; F16D 3/2052
USPC ...................................................... 416/170 R
See application file for complete search history.

(56) References Cited

U.S. PATENT DOCUMENTS

| | | | | |
|---|---|---|---|---|
| 2,478,244 A | * | 8/1949 | Cooley ................... | B63H 3/04 416/163 |
| 3,095,932 A | * | 7/1963 | Hercules .................. | B63H 3/04 416/162 |

(Continued)

FOREIGN PATENT DOCUMENTS

| | | |
|---|---|---|
| CN | 109278985 A | 1/2019 |
| KR | 20190076508 A | 7/2019 |

OTHER PUBLICATIONS

European Exam Report in related European Patent Application No. 20200522.9 dated Apr. 8, 2021, 11 pages.

(Continued)

*Primary Examiner* — Long T Tran
*Assistant Examiner* — James J Kim
(74) *Attorney, Agent, or Firm* — Lightfoot & Alford PLLC

(57) ABSTRACT

A rotor assembly including a rotor mast, a rotor hub coupled to the rotor mast, a plurality of rotor blades coupled to the rotor hub, a control tube extending through the rotor mast, a crosshead coupled to the control tube, and a mechanism configured to drive the rotor mast in rotation. Wherein the mechanism is longitudinally positioned between a top portion and a bottom portion of the control tube and translation of the control tube relative to the rotor mast causes rotation of the rotor blades about their pitch-change axes. While the crosshead is installed, the crosshead is prevented from angular rotation about the mast axis. A pin of a rotor blade assembly is captured between opposing tabs of the crosshead and movable relative to the opposing tabs in response to translation of the crosshead along the mast axis.

20 Claims, 11 Drawing Sheets

(51) Int. Cl.
 *B64C 29/00* (2006.01)
 *F16H 57/02* (2012.01)

(56) References Cited

U.S. PATENT DOCUMENTS

| | | | |
|---|---|---|---|
| 2008/0101934 A1* | 5/2008 | Stamps | B64C 27/33 416/134 A |
| 2014/0124615 A1* | 5/2014 | Thompson | B64C 27/605 416/112 |
| 2017/0297738 A1 | 10/2017 | von Flotow et al. | |
| 2018/0327089 A1* | 11/2018 | Shimek | B32B 27/38 |
| 2019/0135424 A1 | 5/2019 | Baity et al. | |

OTHER PUBLICATIONS

European Search Report in related European Patent Application No. 20200522.9 dated Mar. 25, 2021, 4 pages.
European Exam Report in related European Patent Application No. 20200522.9 dated Mar. 17, 2022, 7 pages.

\* cited by examiner

ROTOR ASSEMBLY

BACKGROUND

Placing a fan inside a duct can result in a system that produces more thrust for the same power. This increase in thrust is produced because the shape of the duct allows the duct to carry a thrust force. In order to maximize efficiency, ducts typically place the fan in a generally cylindrical section of the duct and include a generally quarter toroidal inlet upstream of the fan and a generally frusto-conical diffuser section downstream of the fan. This arrangement accelerates the air across the inlet and decelerates the air at the diffuser, thereby creating a pressure differential on the duct across the fan disk, resulting in additional thrust. The theoretical thrust increase that may be realized by a ducted fan is limited in reality because the mixing of the flow of air through the fan with the flow of air that passes through the gap between the blade tips and the duct causes unfavorable flow characteristics that diminish the pressure differential, and therefore, the system generates less thrust than theoretically possible. Accordingly, in order to maximize additional thrust, minimizing the tip gap is a priority in ducted fan design. However, forces perpendicular to the rotation axis of the mast cause movement of the fan relative to the duct. If the fan moves enough that a fan blade contacts the duct, the result could be catastrophic. Accordingly, contrary to a standard helicopter rotor wherein some flexion is generally desirable, a ducted rotor may preferably be more rigid.

Controls for feathering rotor blades generally include pitch links coupled to pitch horns that extend externally from the blade cuff of each rotor blade, wherein actuation of the pitch links causes rotation of the rotor blades about their pitch-change axes. However, this arrangement requires placement of additional structure between the source of rotational energy and the plane of rotation. Such placement of additional structure may require a longer rotor mast between the source of rotational energy and the rotor hub, thereby decreases the stiffness of the rotor hub assembly.

DETAILED DESCRIPTION

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

Figure 1:
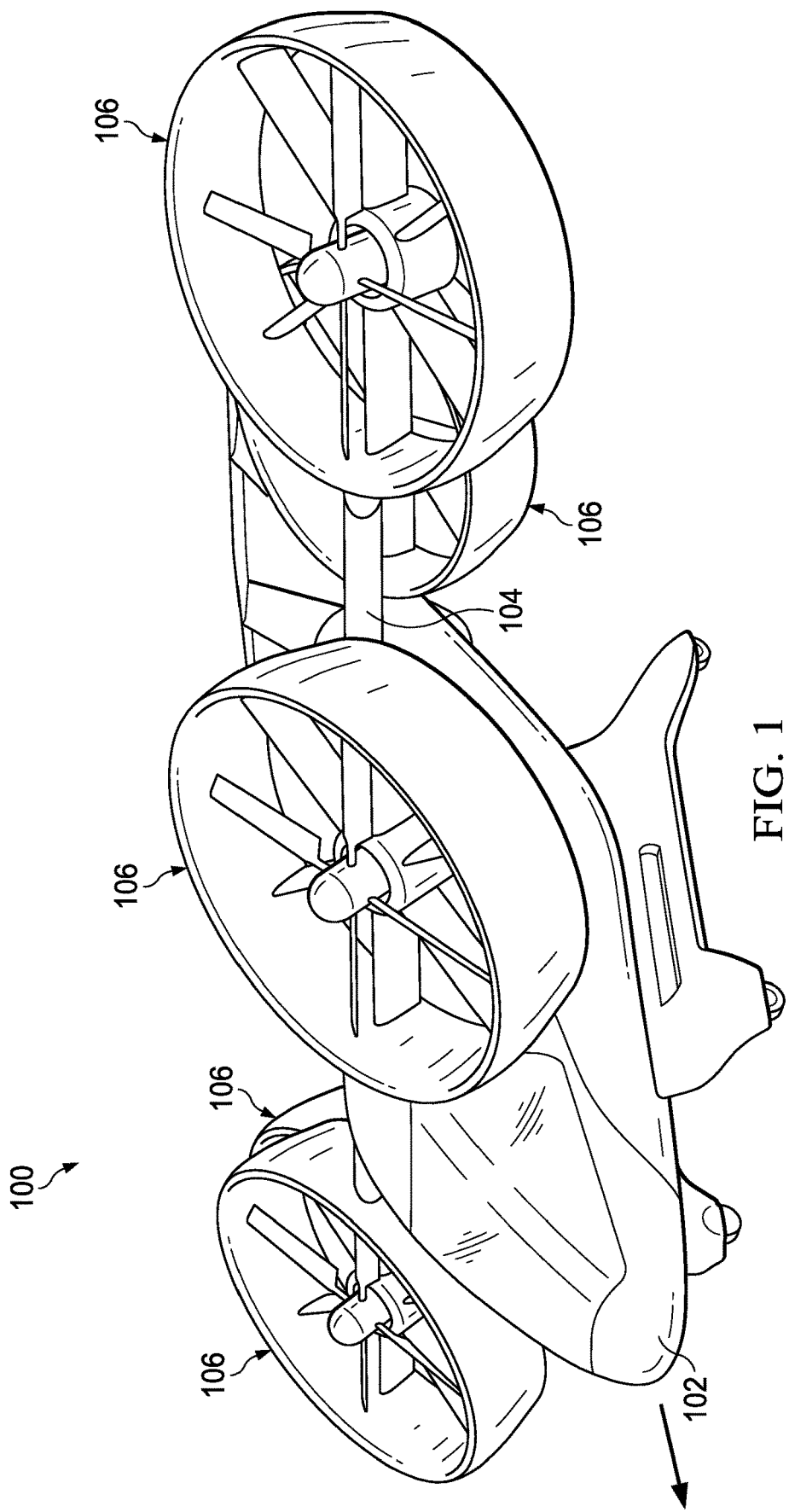
FIG. 1 is an oblique view of an aircraft including a rotor assembly, according to this disclosure.
Figure 2:
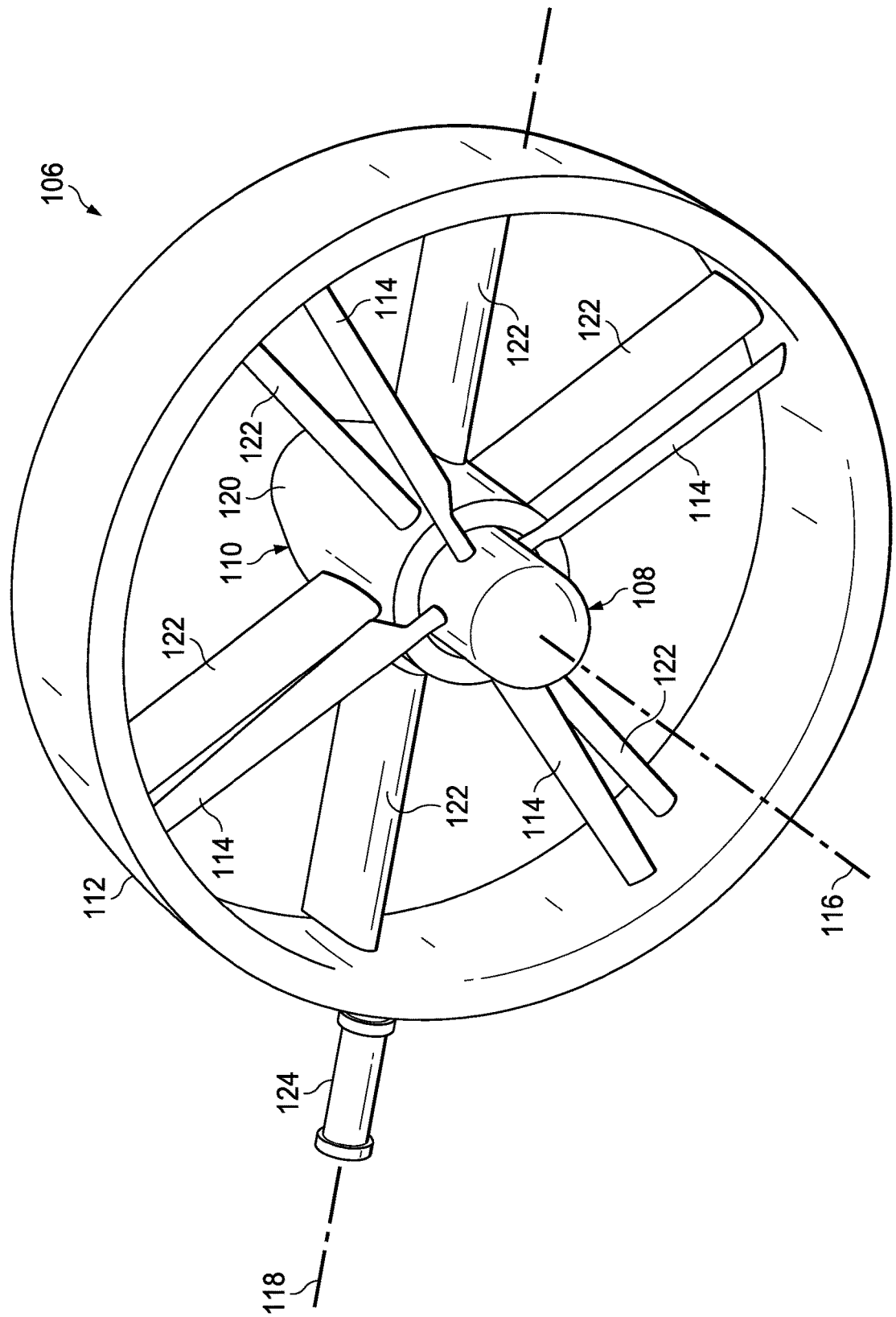
FIG. 2 is an oblique view of a ducted fan of the aircraft of FIG. 1.

This disclosure divulges a rotor assembly that provides mechanical control of the pitch of the rotor blades. The rotor assembly includes a rotor mast, a rotor hub coupled to the rotor mast, a plurality of rotor blades, a control tube extending through the rotor mast and being translatable relative thereto, a crosshead coupled to a top portion of the control tube, and a mechanism for driving rotation of the rotor mast. The rotor blade assemblies are cooperatively engaged with the crosshead so that translation of the control tube and crosshead causes rotation of the rotor blades about their respective pitch-change axes. Translation of the control tube is affected by actuation imparted thereto by a trunnion assembly. The trunnion assembly and the rotor hub are disposed on opposite sides of the mechanism driving the rotor mast FIG. 1 shows an aircraft 100 that is convertible between a helicopter mode, which allows for vertical takeoff and landing, hovering, and low speed directional movement, and an airplane mode, which allows for forward flight as well as horizontal takeoff and landing. Aircraft 100 includes a fuselage 102, a wing 104, and a plurality of ducted fans 106 rotatably coupled to fuselage 102 or wing 104. As best shown in FIG. 2, each ducted fan 106 includes a rotor assembly 108, a flow-straightening stator assembly 110, and a duct 112 surrounding rotor assembly 108 and stator assembly 110. Rotor assembly 108 includes a plurality of rotor blades 114 configured to rotate about a mast axis 116. Rotation of rotor blades 114 about mast axis 116 generates lift while operating in helicopter mode, with ducted fans 106 in a vertically-oriented first position, and thrust while operating in airplane mode, with ducted fans 106 rotated about a tilt axis 118 to a horizontally-oriented second position. Stator assembly 110 is positioned downstream of rotor blades 114 and includes a stator hub 120 centrally located within duct 112 and a plurality of stator vanes 122 coupled between duct 112 and stator hub 120. Stator hub 120 houses a mechanism therein configured to provide rotational energy to rotor assembly 108. The mechanism may comprise an electric motor configured to produce rotational energy. Alternatively, the mechanism may comprise a gearbox therein configured to deliver rotational energy to rotor assembly 108. Wherein the gearbox receives rotational energy from a driveshaft passing through an attachment post 124 and the adjacent stator vane 122.

Referring now to FIGS. 3-6, the components of rotor assembly 108 are described below. Rotor assembly 108 includes a rotor hub 126, a plurality of rotor blade assemblies 128 coupled to rotor hub 126, a rotor mast 130 coupled to rotor hub 126, a control tube 132 extending through rotor mast 130, a crosshead 134 coupled to control tube 132, and a mechanism configured to drive rotor mast 130 in rotation, shown as electric motor 136. Rotor hub 126 includes a plurality of hub arms 138. Each hub arm 138 includes a rotor blade opening 140 configured to receive a blade root 142 of one of rotor blades 114 therein. Rotor hub 126 also includes an access port 144 configured to facilitate assembling rotor assembly 108. Each hub arm 138 includes an outer race 146 of a thrust bearing 148 coupled thereto at the innermost end of rotor blade opening 140. Rotor hub 126 may be directly coupled to rotor mast 130 for common rotation therewith about mast axis 116. Alternatively, rotor hub 126 may be coupled to rotor mast 130 via a mast adapter 150. Rotor hub 126 further includes a fairing 152 coupled thereto which covers access port 144 during operation of rotor assembly 108.

Each rotor blade assembly 128 includes one rotor blade 114 with its blade root 142 disposed within one of hub arms 138 and being rotatable relative thereto about a pitch-change axis 154. An inner race 156 of thrust bearing 148 encircles each blade root 142 and is coupled thereto via a fastener 158. Each rotor assembly 128 further includes a plurality of roller elements 160 of thrust bearing 148 positioned around the circumference of inner race 156 and disposed between inner race 156 and outer race 146. Roller elements 160 carry the axial loads along pitch-change axis 154 while enabling rotor blade 114 to rotate about pitch-change axis 154. While roller elements 160 are shown as spherical, it should be understood that they may be cylindrical, tapered, needle, or any other suitable shape. Each rotor blade assembly 128 also includes a pin 162 extending from blade root 142 configured to impart rotation of rotor blade 114 about pitch-change axis 154 in response to translation of crosshead 134 along mast axis 116. Pin 162 may be coupled to inner race 156, coupled directly to blade root 142, or, as shown, pin 162 may be unitarily formed with inner race 156. Furthermore, pin 162 may include a roller bearing 164 coupled thereto to permit translation of pin 162 relative to crosshead 134. While crosshead 134 is shown as being disposed within rotor hub 126 and pins 162 extending inward, it should be understood that crosshead 134 could be positioned above rotor hub 126 and could be coupled to pitch horns extending laterally from rotor blades 114. An endcap 166 is coupled to the innermost end of rotor blade 114 and/or inner race 156 and a roller element retainer 168 is coupled to endcap 166 via a retaining ring 170. While shown as a separate component, it should be understood that endcap 166 may be unitarily formed with inner race 156. A roller or journal bearing 172 is coupled to each rotor blade 114 adjacent to inner race 156 to react sheer loads between rotor blade 114 and hub arm 138. Journal bearing 172 includes a groove 174 that receives a rotor blade retainer 176 therein to resist inward movement of rotor blade assembly 128 after the assembly of rotor assembly 108 is complete.

Control tube 132 extends coaxially through rotor mast 130 such that a top portion 178 extends above rotor mast 130 and a bottom portion 180 extends below rotor mast 130. Control tube 132 may be coupled to rotor mast 130, via cooperative splines, for common rotation therewith about mast axis 116. Alternatively, control tube 132 may rotate relative to rotor mast 130 by several degrees, wherein rotation of control tube 132 about mast axis 116 is caused by the contact between bearings 164 and crosshead 134, rather than being driven by rotor mast 130. Regardless, control tube 132 is translatable relative to rotor mast 130 along mast axis 116. Mast adapter 150 is coupled to rotor mast 130 via a mast nut 182. Crosshead 134 is coupled to top portion 178 of control tube 132 via a nut 184. Control tube 132 may comprise a one, two, or three-piece structure. As shown, control tube 132 comprises threes tubes, a top tube 186, a middle tube 188, and a bottom tube 190. Top tube 186 is coupled to crosshead 134, bottom tube 190 is coupled to a trunnion assembly 192, and middle tube 188 is coupled between top tube 186 and bottom tube 190. As shown, top portion 178 of control tube 132 comprises parts of both top tube 186 and middle tube 188 and bottom portion 180 comprises bottom tube 190. However, other configurations are considered within the scope of this disclosure.

Crosshead 134 may comprise a multi-part or a unitary structure and includes a plurality of slots 194, each being defined by an upper tab 196 and a lower tab 198. Each slot 194 is configured to receive one pin 162 therein, such that upwards translation of control tube 132 along mast axis 116 causes lower tabs 198 to push pins 162 upwards, through roller bearings 164, causing rotation of rotor blades 114 about pitch-change axes 154 in a first direction and downwards translation of control tube 132 along mast axis 116 causes upper tabs 196 to push pins 162 downwards, through roller bearings 164, causing rotation of rotor blades 114 about pitch-change axes 154 in an opposite second direction.

Figure 3:
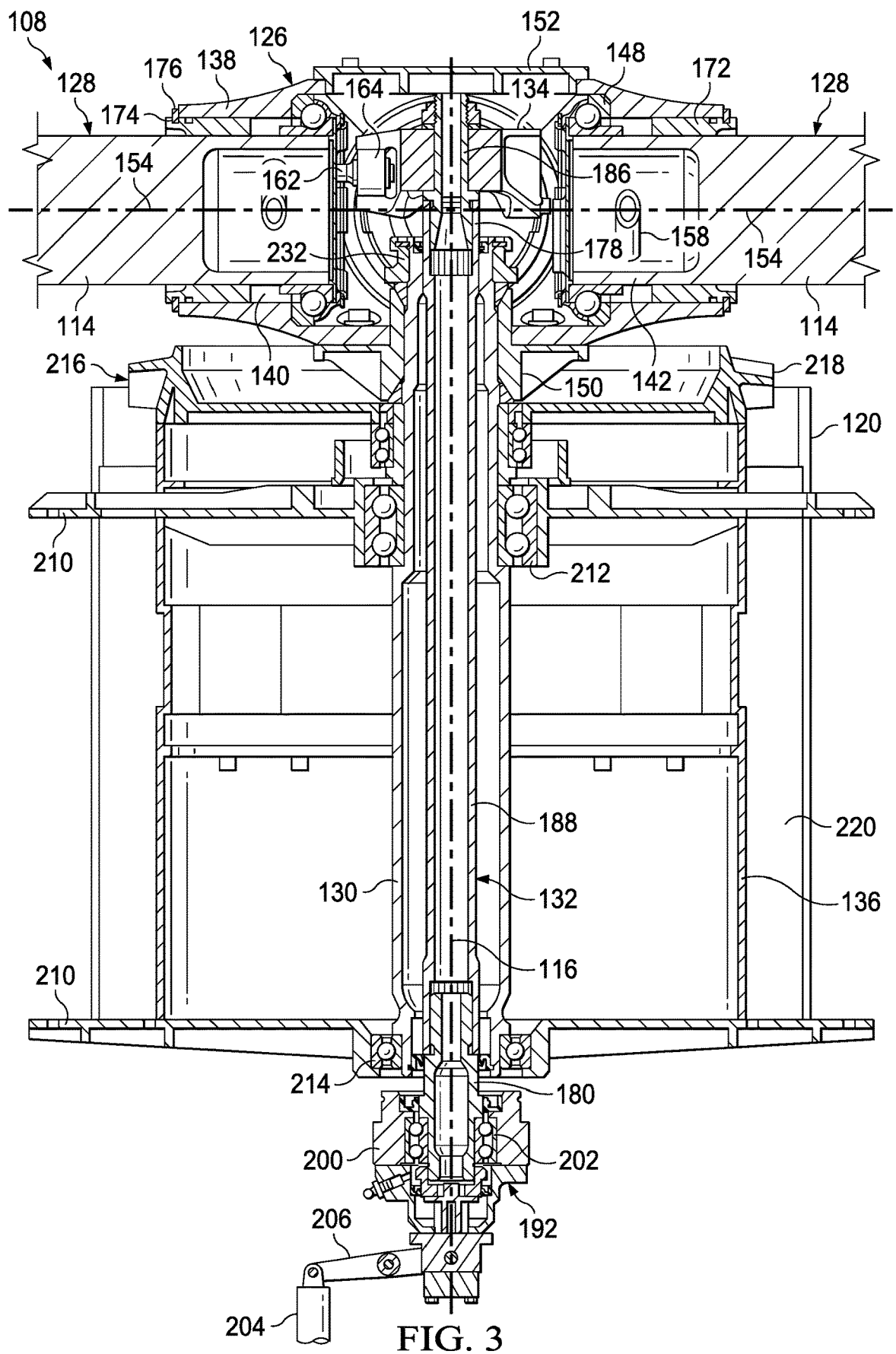
FIG. 3 is a cross-sectional side view of a rotor assembly, according to this disclosure.
Figure 4:
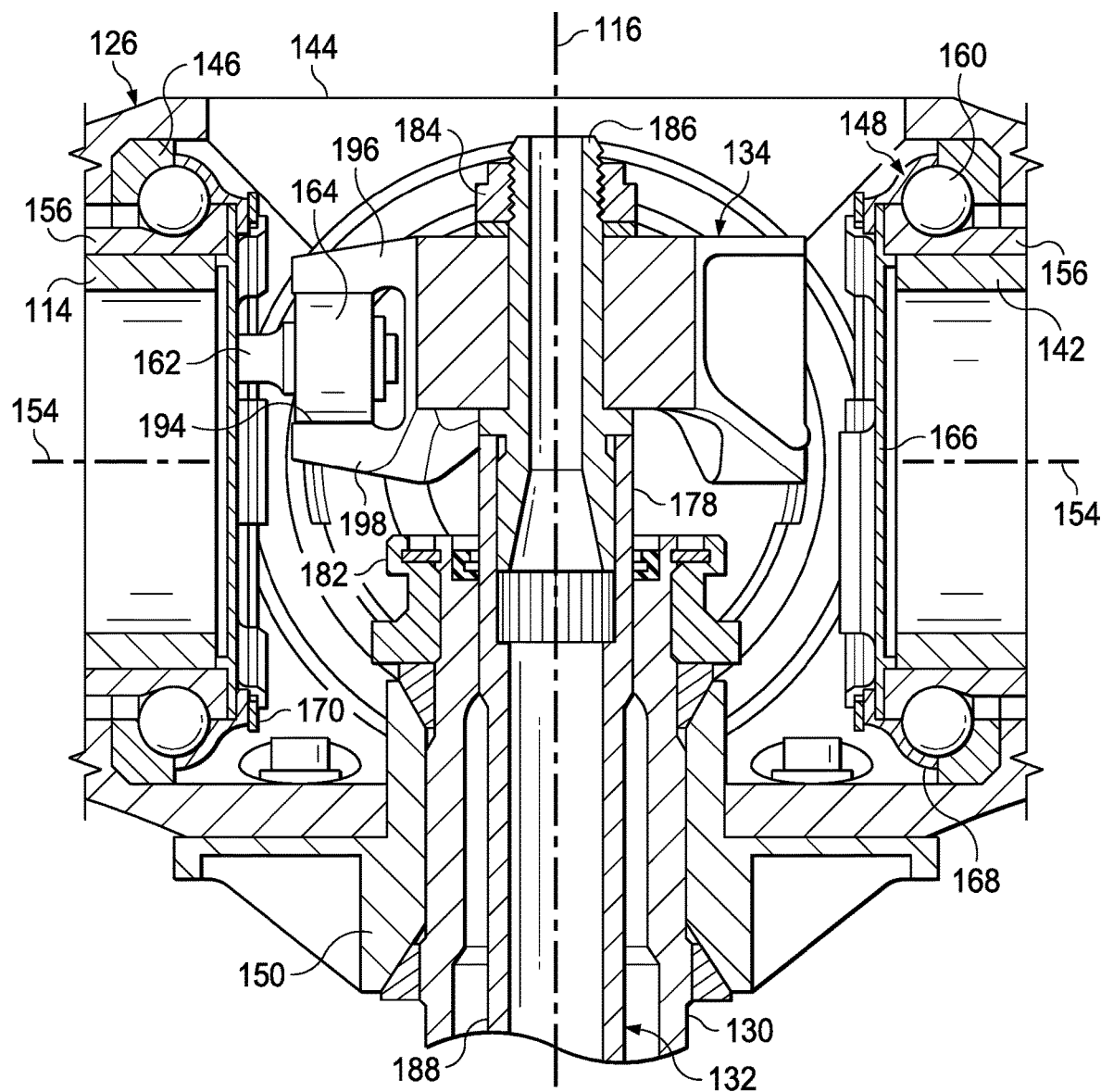
FIG. 4 is a cross-sectional side view of a first portion of the rotor assembly of FIG. 3.
Figure 5:
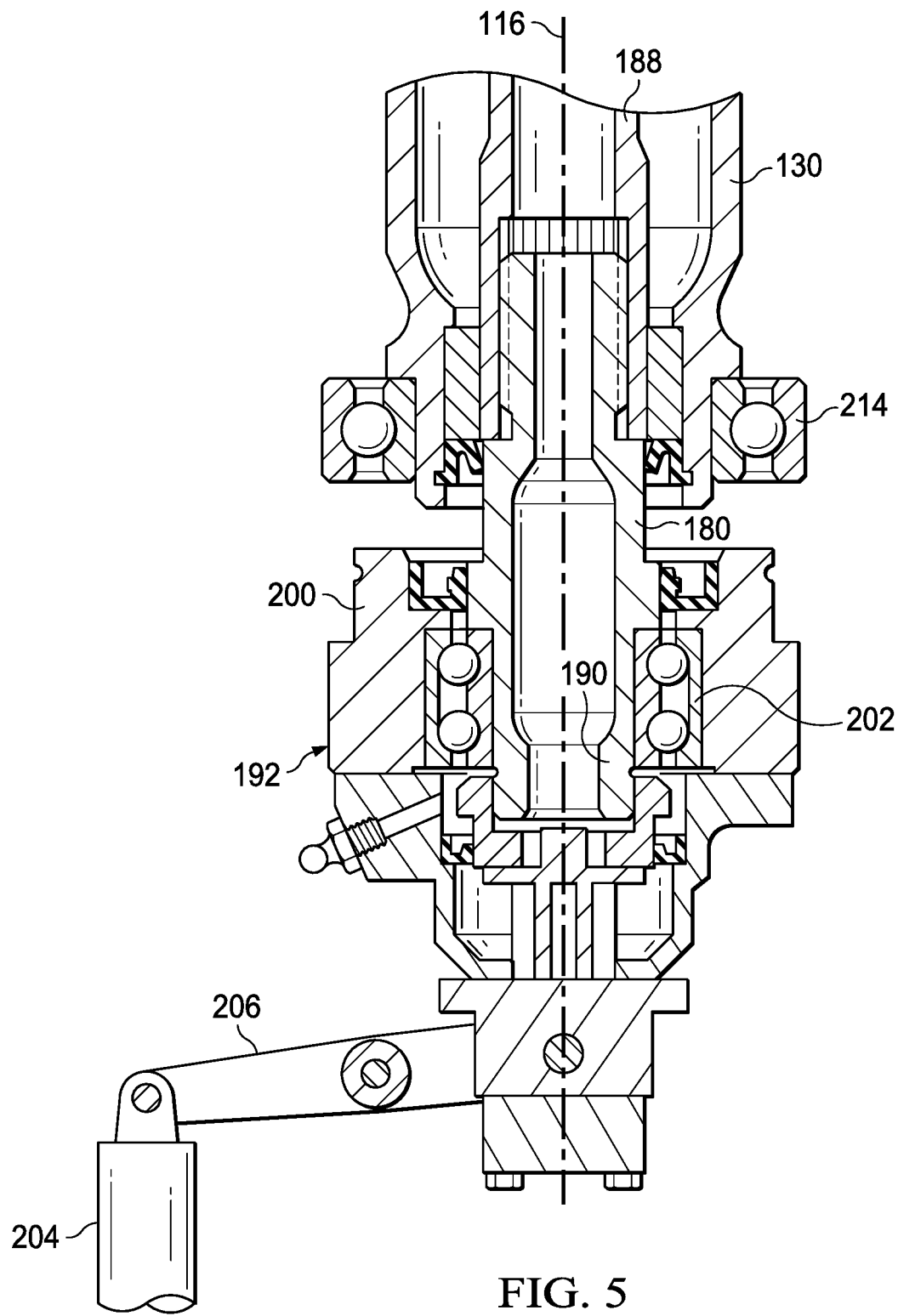
FIG. 5 is a cross-sectional side view of a second portion of the rotor assembly of FIG. 3.
Figure 6:
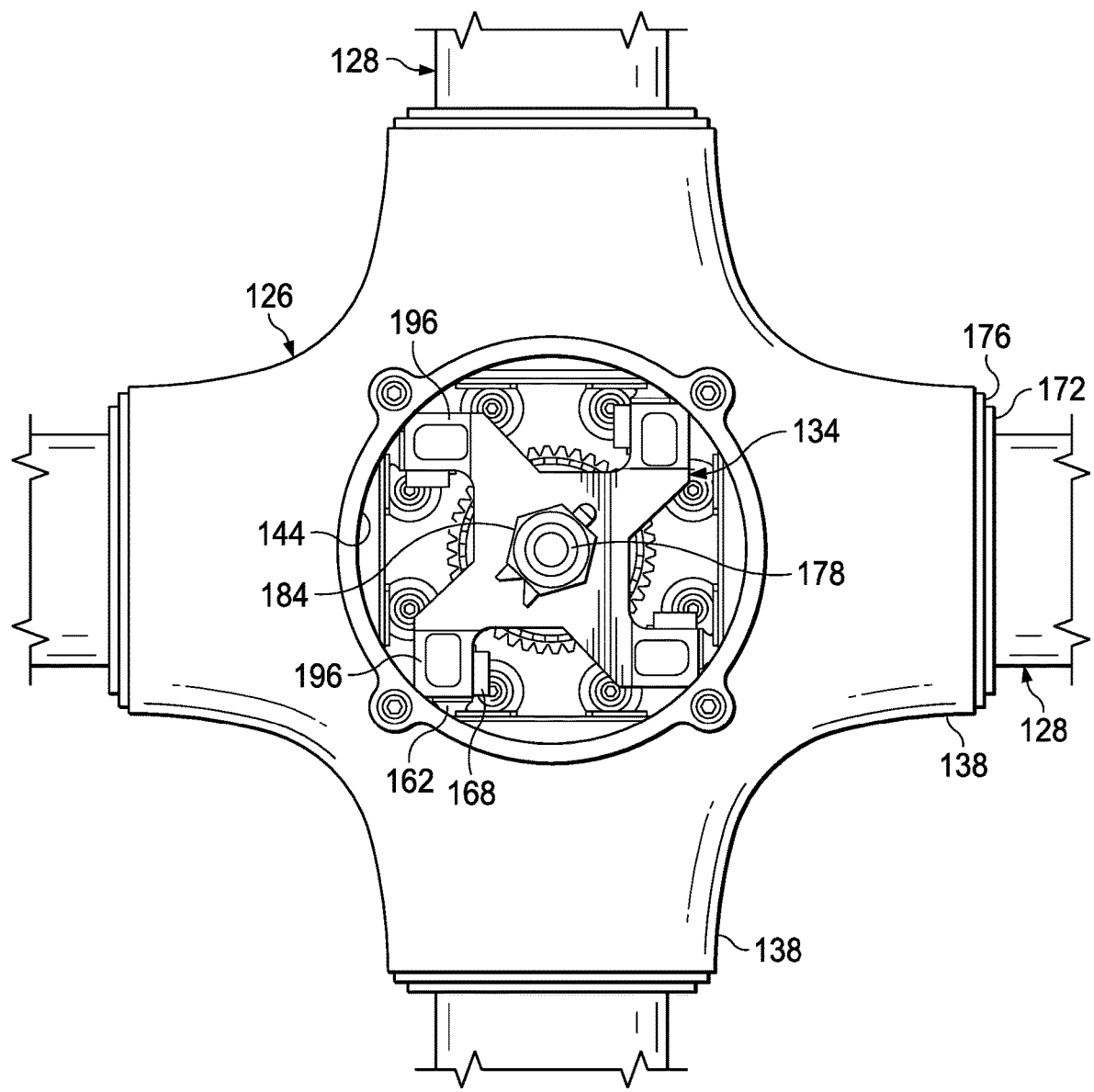
FIG. 6 is a top view of the rotor assembly of FIG. 3.
Figure 7:
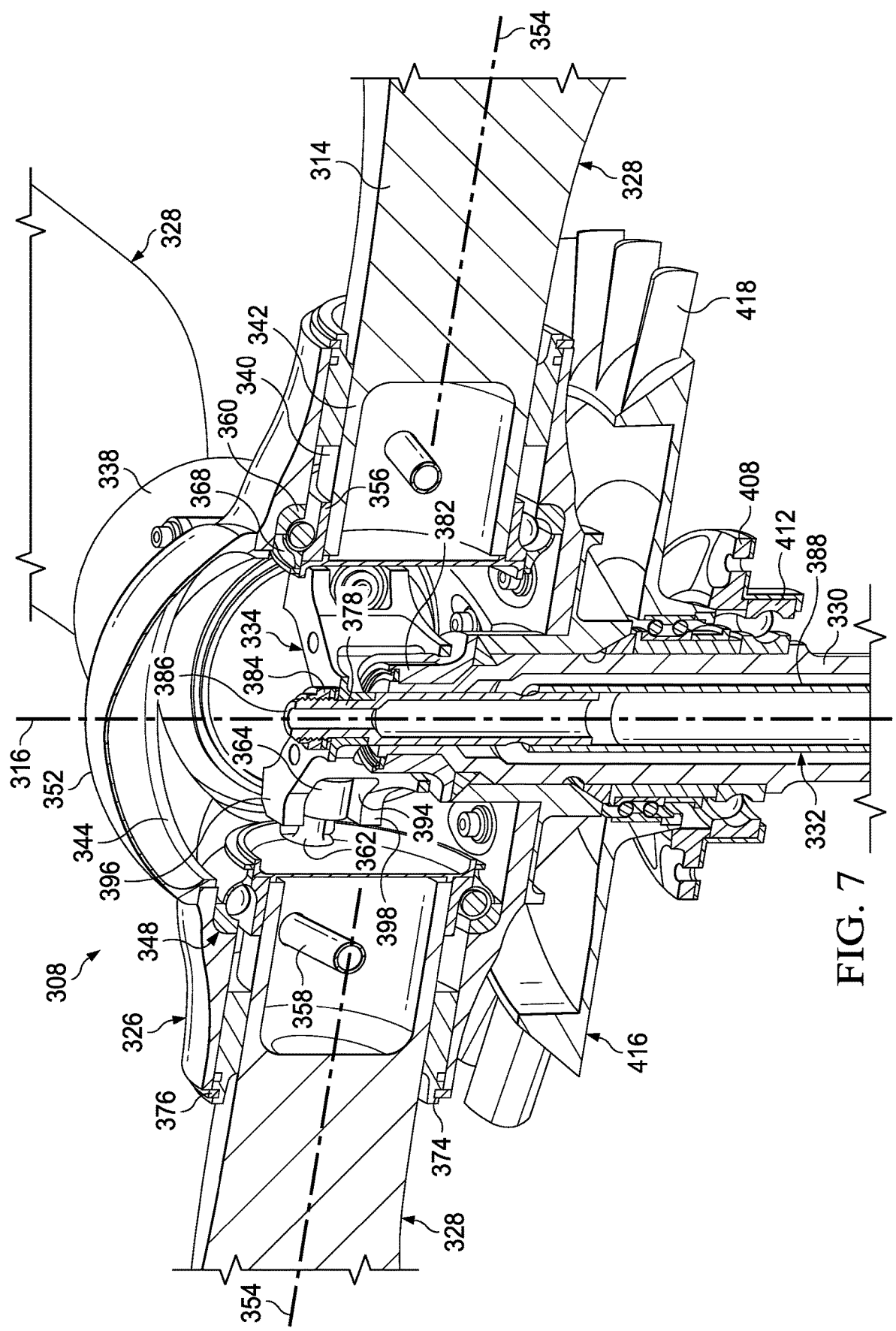
FIG. 7 is an oblique cross-sectional view of another rotor assembly, according to this disclosure.
Figure 8:
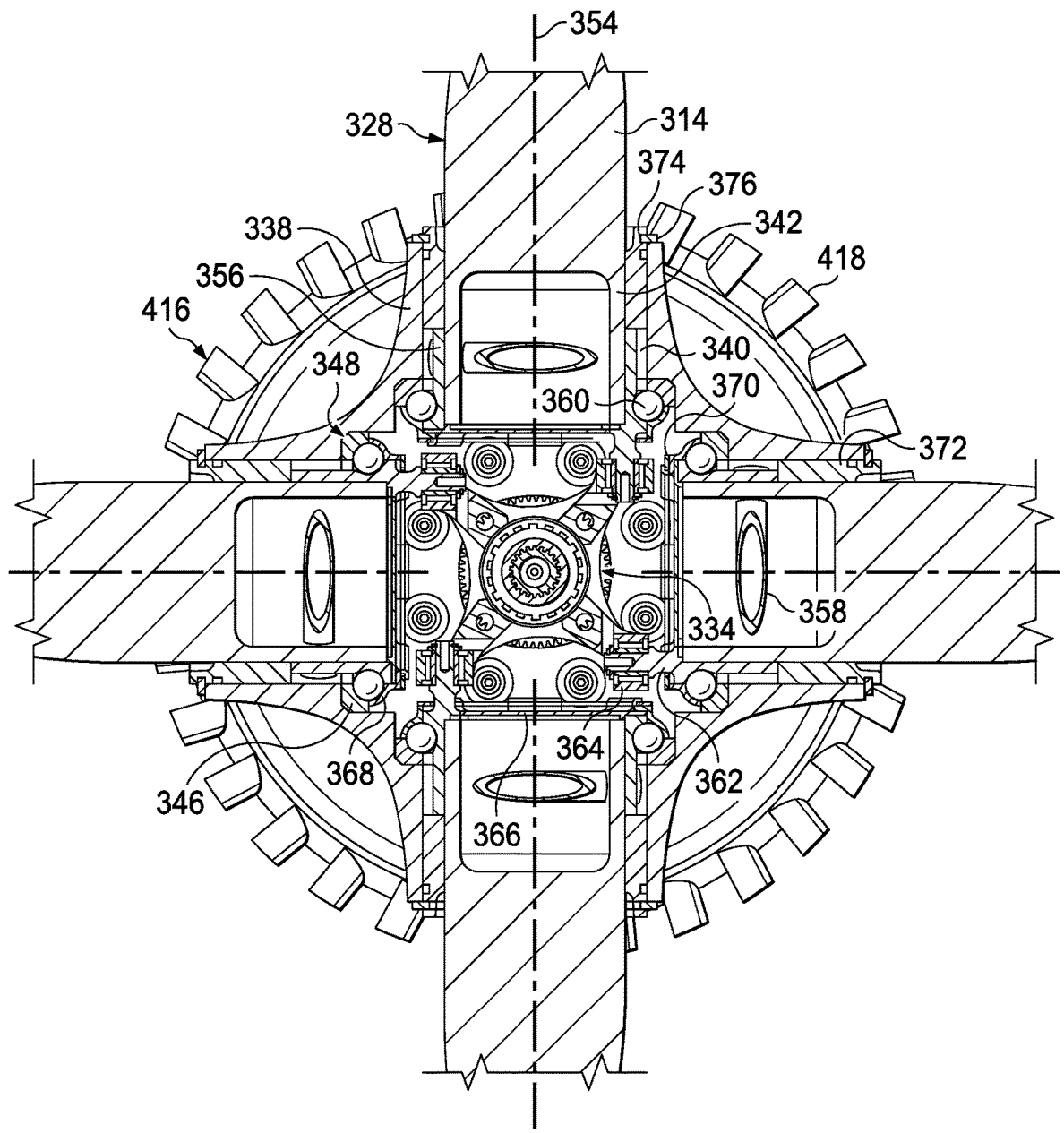
FIG. 8 is a cross-sectional top view of the rotor assembly of FIG. 7.
Figure 9A:
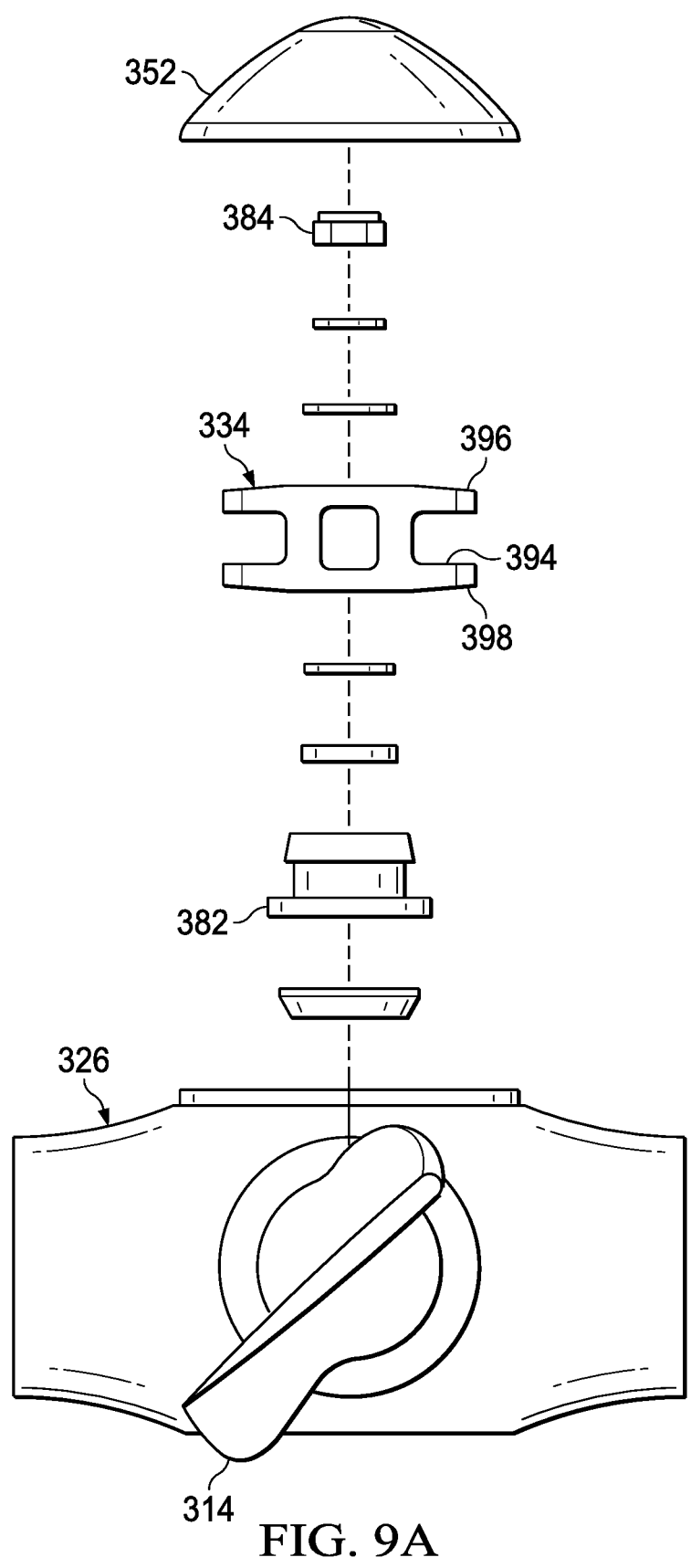
FIG. 9A is an exploded side view of a first portion of the rotor assembly of FIG. 7.
Figure 9B:
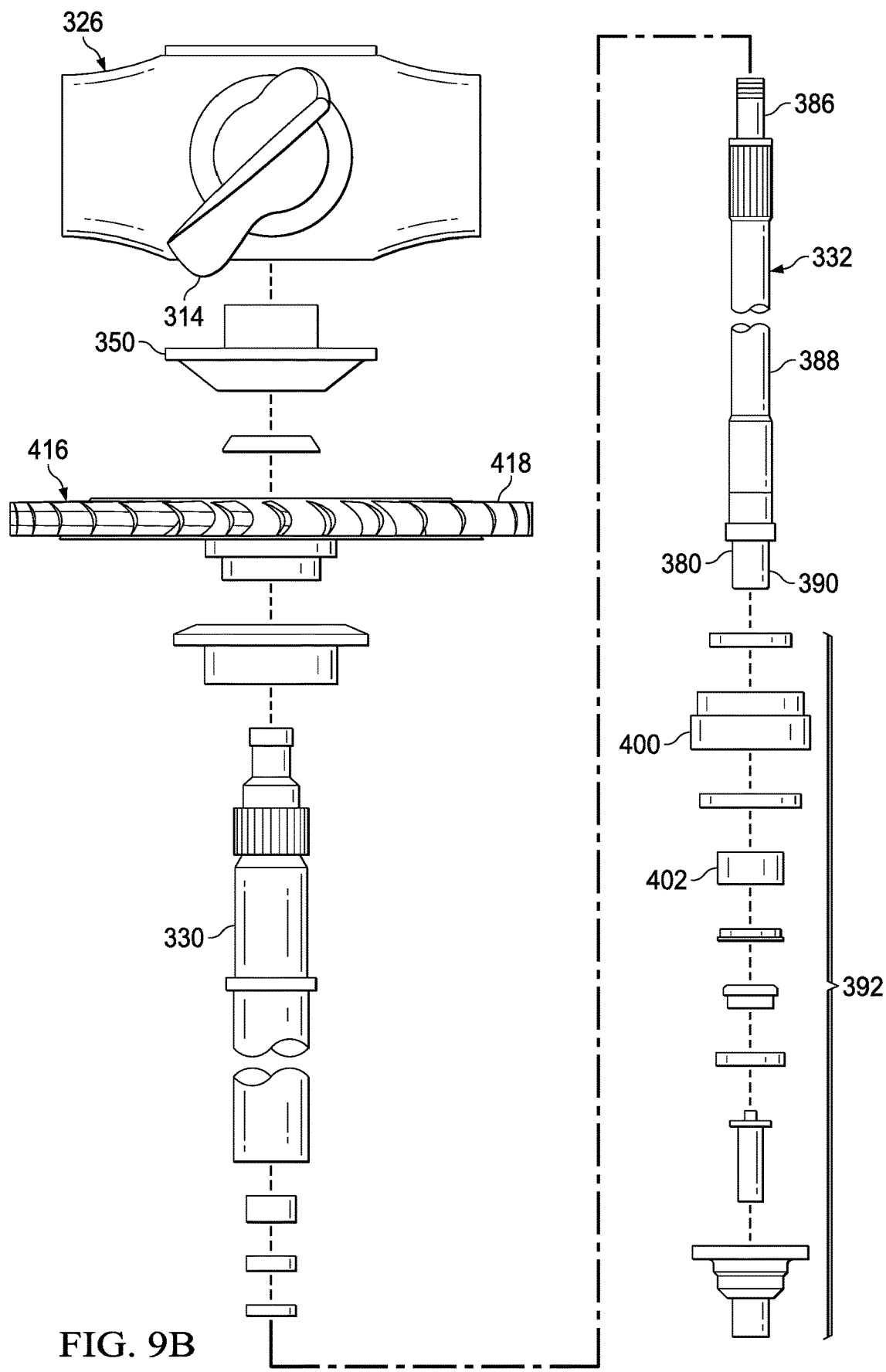
FIG. 9B is an exploded side view of a second portion of the rotor assembly of FIG. 7.
Figure 9C:
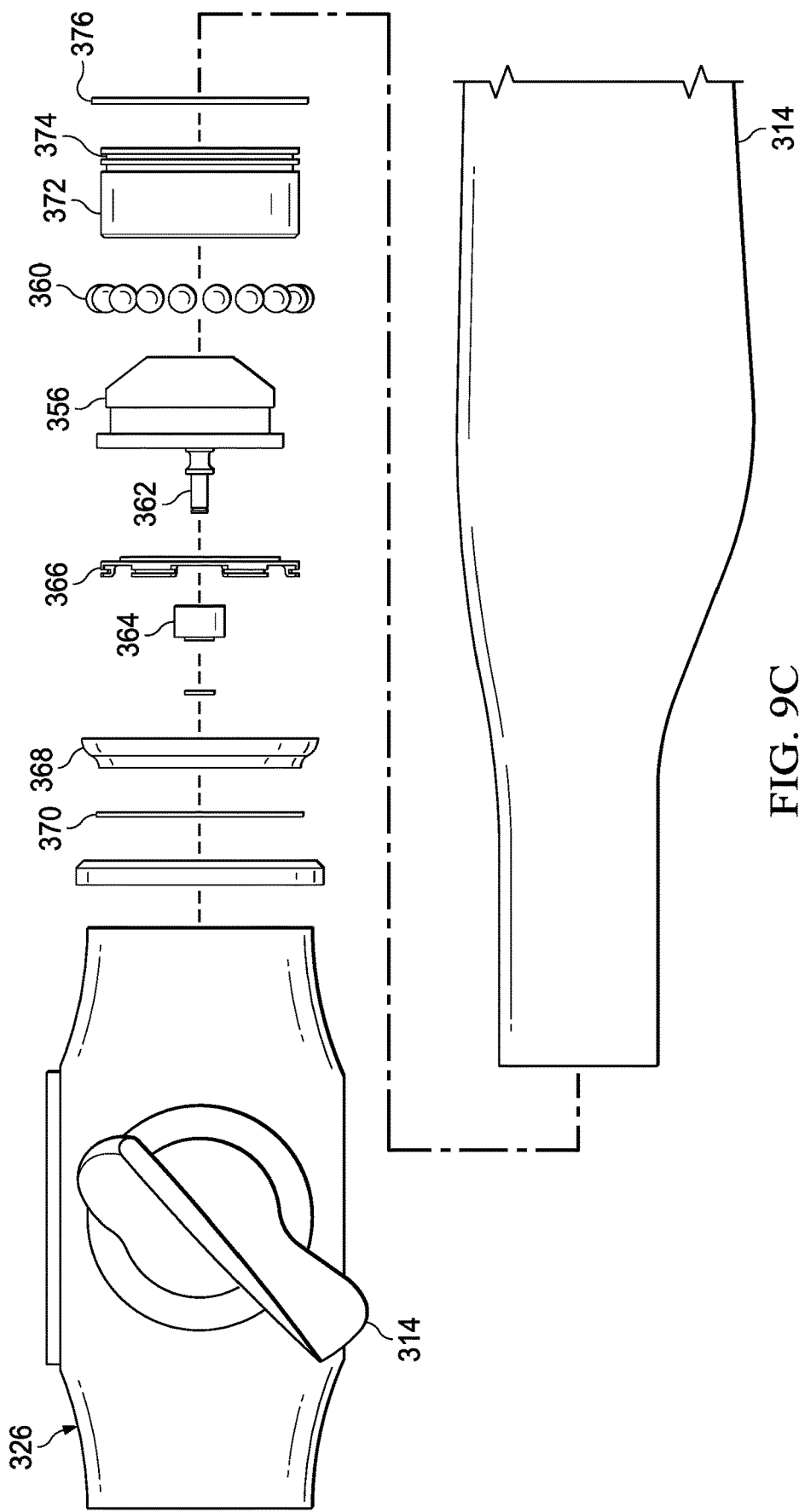
FIG. 9C is an exploded side view of a third portion of the rotor assembly of FIG. 7.

Translation of control tube 132 and crosshead 134 is implemented by trunnion assembly 192. As shown in FIGS. 3 and 5, trunnion assembly 192 includes a non-rotating trunnion 200 coupled to bottom portion 180 of control tube 132 via a trunnion bearing 202. Trunnion 200 is coupled to an actuator 204 via a link 206. Actuator 204 may be electric, hydraulic, or pneumatic. Actuation of actuator 204 imparts translational motion to trunnion 200 which controls the position of control tube 132 and crosshead 134 along mast axis 116, and therefore, the pitch of rotor blades 114 about pitch-change axes 154.

As shown in FIG. 3, rotor assembly 108 may further include electric motor 136 longitudinally positioned between top portion 178 and bottom portion 180 of control tube 132. Wherein rotor mast 130 comprises a drive shaft of electric motor 136. Electric motor 136 is coupled to stator hub 120 via a top bracket 208 and a bottom bracket 210. Rotor mast 130 is coupled to top bracket 208 via a top mast bearing 212 and to bottom bracket 210 via a bottom mast bearing 214. A fan 216 is positioned between rotor hub 126 and electric motor 136. Fan 216 includes fan blades 218 configured to direct cooling airflow through a channel 220 between electric motor 136 and stator hub 120. Fan 216 may also receive rotational energy from electric motor 136. While FIG. 3 shows rotor assembly 108 with electric motor 136, it should be understood that electric motor 136 may be replaced with a gearbox longitudinally displaced between top portion 178 and bottom portion 180 that drives rotor mast 130 and fan 216 in rotation about mast axis 116.

FIGS. 7-9C show another rotor assembly 308, having a similar structure. Rotor assembly 308 includes a rotor hub 326, a plurality of rotor blade assemblies 328 coupled to rotor hub 326, a rotor mast 330 coupled to rotor hub 326, a control tube 332 extending through rotor mast 330, a crosshead 334 coupled to control tube 332, and a mechanism configured to drive rotor mast 330 in rotation. Rotor hub 326 includes a plurality of hub arms 338. Each hub arm 338 includes a rotor blade opening 340 configured to receive a blade root 342 of one of rotor blades 314 therein. Rotor hub 326 also includes an access port 344 configured to facilitate assembling rotor assembly 308. Each hub arm 338 includes an outer race 346 of a thrust bearing 348 coupled thereto at the innermost end of rotor blade opening 340. Rotor hub 326 may be directly coupled to rotor mast 330 for common rotation therewith about mast axis 316. Alternatively, rotor hub 326 may be coupled to rotor mast 330 via a mast adapter 350. Rotor hub 326 further includes a fairing 352 coupled thereto which covers access port 344 during operation of rotor assembly 308.

Each rotor blade assembly 328 includes one rotor blade 314 with its blade root 342 disposed within one of hub arms 338 and being rotatable relative thereto about a pitch-change axis 354. An inner race 356 of thrust bearing 348 encircles each blade root 342 and is coupled thereto via a fastener 358. Each rotor blade assembly 328 further includes a plurality of roller elements 360 of thrust bearing 348 positioned around the circumference of inner race 356 and disposed between inner race 356 and outer race 346. Roller elements 360 carry the axial loads along pitch-change axis 354 while enabling rotor blade 314 to rotate about pitch-change axis 354. While roller elements 360 are shown as spherical, it should be understood that they may be cylindrical, tapered, needle, or any other suitable shape. Each rotor blade assembly 328 also includes a pin 362 extending from blade root 342 configured to impart rotation of rotor blade 314 about pitch-change axis 354 in response to translation of crosshead 334 along mast axis 316. Pin 362 may be coupled to inner race 356, coupled directly to blade root 342, or, as shown, pin 362 may be unitarily formed with inner race 356. Furthermore, pin 362 may include a roller bearing 364 coupled thereto to permit translation of pin 362 relative to crosshead 334. While crosshead 334 is shown as being disposed within rotor hub 326 and pins 362 extending inward, it should be understood that crosshead 334 could be positioned above rotor hub 326 and could be coupled to pitch horns extending laterally from rotor blades 314. An endcap 366 is coupled to the innermost end of rotor blade 314 and/or inner race 356 and a roller element retainer 368 is coupled to endcap 366 via a retaining ring 370. While shown as a separate component, it should be understood that endcap 366 may be unitarily formed with inner race 356. A roller or journal bearing 372 is coupled to each rotor blade 314 adjacent to inner race 356 to react sheer loads between rotor blade 314 and hub arm 338. Journal bearing 372 includes a groove 374 that receives a rotor blade retainer 376 therein to resist inward movement of rotor blade assembly 328 after the assembly of rotor assembly 308 is complete.

Control tube 332 extends coaxially through rotor mast 330 such that a top portion 378 extends above rotor mast 330 and a bottom portion 380 extends below rotor mast 330. Control tube 332 may be coupled to rotor mast 330, via cooperative splines, for common rotation therewith about mast axis 316. Alternatively, control tube 332 may rotate relative to rotor mast 330 by several degrees, wherein rotation of control tube 332 about mast axis 316 is caused by the contact between bearings 364 and crosshead 334, rather than being driven by rotor mast 330. Regardless, control tube 332 is translatable relative to rotor mast 330 along mast axis 316. Mast adapter 350 is coupled to rotor mast 330 via a mast nut 382. Crosshead 334 is coupled to top portion 378 of control tube 332 via a nut 384. Control tube 332 may comprise a one, two, or three-piece structure. As shown, control tube 332 comprises threes tubes, a top tube 386, a middle tube 388, and a bottom tube 390. Top tube 386 is coupled to crosshead 334, bottom tube 390 is coupled to a trunnion assembly 392, and middle tube 388 is coupled between top tube 386 and bottom tube 390. Contrary to top portion 178 of control tube 132, top portion 378 of control tube 332 only comprises part of top tube 386. However, other configurations are considered within the scope of this disclosure.

Crosshead 334 may comprise a multi-part or a unitary structure and includes a plurality of slots 394, each being defined by an upper tab 396 and a lower tab 398. Each slot 394 is configured to receive one pin 362 therein, such that upwards translation of control tube 332 along mast axis 316 causes lower tabs 398 to push pins 362 upwards, through roller bearings 364, causing rotation of rotor blades 314 about pitch-change axes 354 in a first direction and downwards translation of control tube 332 along mast axis 316 causes upper tabs 396 to push pins 362 downwards, through roller bearings 364, causing rotation of rotor blades 314 about pitch-change axes 354 in an opposite second direction.

Translation of control tube 332 and crosshead 334 is implemented by trunnion assembly 392. Trunnion assembly 392 includes a non-rotating trunnion 400 coupled to bottom portion 380 of control tube 332 via a trunnion bearing 402. Trunnion 400 is coupled to an actuator via a link. The actuator may be electric, hydraulic, or pneumatic. Actuation of the actuator imparts translational motion to trunnion 400 which controls the position of control tube 332 and crosshead 334 along mast axis 316, and therefore, the pitch of rotor blades 314 about pitch-change axes 354.

Similar to rotor assembly 108, rotor assembly 308 may further include electric motor longitudinally positioned between top portion 378 and bottom portion 380 of control tube 332. Wherein rotor mast 330 comprises a drive shaft of the electric motor. The electric motor is coupled to stator hub 120 via a top bracket 408 and a bottom bracket. Rotor mast 330 is coupled to top bracket 408 via a top mast bearing 412 and to the bottom bracket via a bottom mast bearing. A fan 416 is positioned between rotor hub 326 and the electric motor. Fan 416 includes fan blades 418 configured to direct cooling airflow through a channel between the electric motor and stator hub 120. Fan 416 may also receive rotational energy from the electric motor. It should be understood that the electric motor may be replaced with a gearbox longitudinally displaced between top portion 378 and bottom portion 380 that drives rotor mast 330 and fan 416 in rotation about mast axis 316.

The components of rotor assemblies 108 and 308 may comprise any materials suitable for use with an aircraft rotor. For example, rotor blades 114 and 314 and rotor hubs 126 and 326 may comprise carbon fiber or aluminum; and rotor masts 130 and 330, control tubes 132 and 332, rotor hubs 126 and 326, outer races 146 and 346, inner races 156 and 356, mast nuts 182 and 382, mast adapters 150 and 350 may comprise steel or titanium. While rotor hub assemblies 108 and 308 are shown with four rotor blades 114 and 314, respectively, it should be understood that they may have as few as two rotor blades and may have more than four rotor blades.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotor assembly, comprising:
a rotor mast configured to be driven in rotation about a mast axis;
a rotor hub coupled to the rotor mast for common rotation therewith about the mast axis;
a plurality of rotor blade assemblies coupled to the rotor hub for common rotation therewith about the mast axis, each rotor blade assembly being rotatable relative to the rotor hub about a pitch-change axis;
a control tube extending through the rotor mast wherein a top portion extends above the rotor mast and a bottom portion extends below the rotor mast, the control tube being translatable relative to the rotor mast along the mast axis;
a crosshead coupled to the control tube, the crosshead being configured to cooperatively engage the plurality of rotor blade assemblies, wherein translation of the crosshead along the mast axis causes rotation of the plurality of rotor blade assemblies about their pitch-change axes; and
a mechanism configured to drive the rotor mast in rotation, wherein the mechanism is longitudinally positioned between the top portion and the bottom portion of the control tube;
wherein while the crosshead is installed, the crosshead is prevented from angular rotation about the mast axis; and
wherein a pin of a rotor blade assembly is captured between opposing tabs of the crosshead and movable relative to the opposing tabs in response to translation of the crosshead along the mast axis.

2. The rotor assembly of claim 1, wherein the mechanism comprises an electric motor.

3. The rotor assembly of claim 2, wherein the rotor mast comprises a drive shaft of the electric motor.

4. The rotor assembly of claim 1, wherein the mechanism comprises a gearbox.

5. The rotor assembly of claim 1, further comprising:
a trunnion coupled to the bottom portion of the control tube, wherein the trunnion is configured to permit the control tube to rotate relative to the trunnion.

6. The rotor assembly of claim 5, further comprises:
an actuator coupled to the trunnion, wherein the actuator is configured to impart translational motion to the trunnion along the mast axis.

7. A rotor assembly, comprising:
a rotor mast configured to be driven in rotation about a mast axis;
a rotor hub coupled to the rotor mast for common rotation therewith about the mast axis;
a plurality of rotor blade assemblies coupled to the rotor hub for common rotation therewith about the mast axis, each rotor blade assembly being rotatable relative to the rotor hub about a pitch-change axis;
a control tube extending through the rotor mast wherein a top portion extends above the rotor mast and a bottom portion extends below the rotor mast, the control tube being translatable relative to the rotor mast along the mast axis;
a crosshead coupled to the control tube, the crosshead being configured to cooperatively engage the plurality of rotor blade assemblies, wherein translation of the crosshead along the mast axis causes rotation of the plurality of rotor blade assemblies about their pitch-change axes, the crosshead being disposed within the rotor hub;
a mechanism configured to drive the rotor mast in rotation, wherein the mechanism is longitudinally positioned between the top portion and the bottom portion of the control tube; and
a trunnion assembly configured to impart translational motion to the control tube, the trunnion assembly comprising:
a trunnion coupled to the bottom portion of the control tube via a trunnion bearing; and
an actuator coupled to the trunnion;
wherein while the crosshead is installed, the crosshead is prevented from angular rotation about the mast axis; and
wherein a pin of a rotor blade assembly is captured between opposing tabs of the crosshead and movable relative to the opposing tabs in response to translation of the crosshead along the mast axis.

8. The rotor assembly of claim 7, wherein the mechanism comprises an electric motor.

9. The rotor assembly of claim 7, wherein the mechanism comprises a gearbox.

10. The rotor assembly of claim 7, wherein the control tube comprises three separate tubes coupled together.

11. The rotor assembly of claim 7, wherein the actuator is electric.

12. The rotor assembly of claim 8, further comprising:
a fan disposed between the rotor hub and the electric motor.

13. An aircraft, comprising:
a fuselage;

a first rotor assembly configured to provide vertical lift and/or forward thrust, comprising:
   a rotor mast configured to be driven in rotation about a mast axis;
   a rotor hub coupled to the rotor mast for common rotation therewith about the mast axis;
   a plurality of rotor blade assemblies coupled to the rotor hub for common rotation therewith about the mast axis, each rotor blade assembly being rotatable relative to the rotor hub about a pitch-change axis;
   a control tube extending through the rotor mast wherein a top portion extends above the rotor mast and a bottom portion extends below the rotor mast, the control tube being translatable relative to the rotor mast along the mast axis;
   a crosshead coupled to the control tube, the crosshead being configured to cooperatively engage the plurality of rotor blade assemblies, wherein translation of the crosshead along the mast axis causes rotation of the plurality of rotor blade assemblies about their pitch-change axes; and
   a trunnion assembly configured to impart translational motion to the control tube, the trunnion assembly comprising:
      a trunnion coupled to the bottom portion of the control tube via a trunnion bearing; and
      an actuator coupled to the trunnion
wherein while the crosshead is installed, the crosshead is prevented from angular rotation about the mast axis; and
wherein a pin of a rotor blade assembly is captured between opposing tabs of the crosshead and movable relative to the opposing tabs in response to translation of the crosshead along the mast axis.

14. The aircraft of claim 13, further comprising:
a mechanism configured to drive the rotor mast in rotation, wherein the mechanism is longitudinally positioned between the top portion and the bottom portion of the control tube.

15. The aircraft of claim 14, wherein the mechanism comprises an electric motor.

16. The aircraft of claim 15, further comprising:
a second rotor assembly configured to provide vertical lift and/or forward thrust, wherein comprising:
   a rotor mast configured to be driven in rotation about a mast axis;
   a rotor hub coupled to the rotor mast for common rotation therewith about the mast axis;
   a plurality of rotor blade assemblies coupled to the rotor hub for common rotation therewith about the mast axis, each rotor blade assembly being rotatable relative to the rotor hub about a pitch-change axis;
   a control tube extending through the rotor mast wherein a top portion extends above the rotor mast and a bottom portion extends below the rotor mast, the control tube being translatable relative to the rotor mast along the mast axis;
   a crosshead coupled to the control tube, the crosshead being configured to cooperatively engage the plurality of rotor blade assemblies, wherein translation of the crosshead along the mast axis causes rotation of the plurality of rotor blade assemblies about their pitch-change axes;
   a trunnion assembly configured to impart translational motion to the control tube, the trunnion assembly comprising:
      a trunnion coupled to the bottom portion of the control tube via a trunnion bearing; and
      an actuator coupled to the trunnion; and
   an electric motor configured to drive the rotor mast of the second rotor assembly in rotation.

17. The aircraft of claim 16, wherein the first and second rotor assemblies are configured to rotate relative to the fuselage between a first position wherein they produce lift and a second position wherein they produce forward thrust.

18. The aircraft of claim 17, wherein the control tube of each of the first and second rotor assemblies comprises three separate tubes coupled together.

19. The aircraft of claim 18, further comprising:
a first fan disposed between the rotor hub and the electric motor of the first hub assembly; and
a second fan disposed between the rotor hub and the electric motor of the second hub assembly.

20. The aircraft of claim 19, further comprising:
a first duct surrounding the first rotor assembly; and
a second duct surrounding the second rotor assembly.

\* \* \* \* \*